US008966012B2

(12) United States Patent
Drysdale et al.

(10) Patent No.: US 8,966,012 B2
(45) Date of Patent: Feb. 24, 2015

(54) PROCESSING DATA AND OPERATING A COMMUNICATIONS DEVICE

(75) Inventors: David Drysdale, London (GB); Michael Bell, Edinburgh (GB)

(73) Assignee: Metaswitch Networks Ltd, Enfield (GB)

( * ) Notice: Subject to any disclaimer, the term of this patent is extended or adjusted under 35 U.S.C. 154(b) by 268 days.

(21) Appl. No.: 13/598,564

(22) Filed: Aug. 29, 2012

(65) Prior Publication Data

US 2013/0227058 A1 Aug. 29, 2013

Related U.S. Application Data

(60) Provisional application No. 61/529,686, filed on Aug. 31, 2011.

(51) Int. Cl.
*G06F 15/16* (2006.01)
*H04L 12/911* (2013.01)
*H04W 4/00* (2009.01)
*G06F 12/00* (2006.01)

(52) U.S. Cl.
CPC ............. *H04L 47/70* (2013.01); *H04W 4/001* (2013.01); *H04W 4/003* (2013.01)
USPC ......................................................... 709/219

(58) Field of Classification Search
CPC .......... G06F 11/2056; G06F 17/30197; G06F 11/1076; G06F 11/2058; G06F 2211/1028; G06F 11/1456; G06F 11/1458; G06F 11/1461; G06F 11/1464; G06F 11/1469; G06F 2003/0697; G06F 2201/84; G06F 3/0601
USPC ........................... 709/217–219, 223–229, 250
See application file for complete search history.

(56) References Cited

U.S. PATENT DOCUMENTS

| | | | | |
|---|---|---|---|---|
| 6,356,934 | B1 * | 3/2002 | Delph | 709/204 |
| 7,401,159 | B1 * | 7/2008 | Aviani et al. | 709/238 |
| 8,037,181 | B2 * | 10/2011 | Parham et al. | 709/226 |

(Continued)

FOREIGN PATENT DOCUMENTS

WO 2010068448 A2 6/2010

OTHER PUBLICATIONS http://blogs.citrix.com/2010/10/15/configuring-persistence-based-load-balancing/, "Configuring Persistence based Load Balancing | Citrix Blogs", Oct. 15, 2010.

(Continued)

*Primary Examiner* — Zarni Maung
(74) *Attorney, Agent, or Firm* — EIP US LLP

(57) ABSTRACT

Processing data in a communications system comprising a plurality of servers is provided. First data received from a communications device is directed to a given server in the plurality of servers. A server identifier identifying the given server is transmitted to the communications device. Subsequent data is received from the communications device. The subsequent data comprises the server identifier and a further parameter. The given server is selected on the basis of at least the server identifier and some of the subsequent data received from the communications device is directed to the given server. In the event of a need to redirect subsequent data to a server other than the given server, a different server is selected on the basis of at least the further parameter and further of the subsequent data received from the communications device is directed to the selected different server.

18 Claims, 6 Drawing Sheets

(56) References Cited

U.S. PATENT DOCUMENTS

| | | | |
|---|---|---|---|
| 2003/0037108 A1 | 2/2003 | Peiffer et al. | |
| 2003/0172164 A1 | 9/2003 | Coughlin | |
| 2006/0242263 A1* | 10/2006 | Sato et al. | 709/217 |
| 2007/0220155 A1 | 9/2007 | Nalla et al. | |
| 2008/0104607 A1 | 5/2008 | Baker | |
| 2009/0031024 A1* | 1/2009 | Gissel et al. | 709/224 |
| 2009/0271515 A1 | 10/2009 | Iyengar et al. | |
| 2009/0271798 A1 | 10/2009 | Iyengar et al. | |
| 2009/0287846 A1 | 11/2009 | Iyengar et al. | |
| 2010/0131658 A1 | 5/2010 | Goyal et al. | |
| 2011/0093531 A1 | 4/2011 | Schnetzler | |
| 2012/0203915 A1* | 8/2012 | Moeller et al. | 709/227 |
| 2013/0290437 A1* | 10/2013 | Saib | 709/206 |

OTHER PUBLICATIONS http://blogs.citrix.com/2010/06/01/configuring-verifying-and-monitoring-persistence-on-netscaler/, "Configuring, Verifying and Monitoring Persistence on NetScaler | Citrix . . . ", Jun. 1, 2010.

http://blogs.citrix.com/2010/10/18/load-balancing-cookie-persistence/, "Load Balancing-Cookie Persistence | Citrix Blogs", Oct. 18, 2010.

http://blogs.citrix.com/2010/10/21/load-balancing-destination-ip-persistence/, "Load Balancing-Destination IP Persistence | Citrix Blogs", Oct. 21, 2010.

http://blogs.citrix.com/2010/09/04/load-balancing-hash-method/, "Load Balancing-Hash Method | Citrix Blogs", Sep. 4, 2010.

http://blogs.citrix.com/2010/10/21/load-balancing-server-id-persistence/, "Load Balancing-Server ID Presistence | Citrix Blogs", Oct. 21, 2010.

http://blogs.citrix.com/2010/10/20/load-balancing-user-defined-persistence/, "Load Balancing-Hash Method | Citrix Blogs", Oct. 20, 2010.

https://blogs.oracle.com/kshitiz/entry/converged_load_balancer, Kshitiz Saxena, Mar. 24, 2008.

https://community.jboss.org/docs/DOC-12806, Brian Stansberry, Oct. 13, 2008.

http://web.archive.org/web/20101021034144/http:/httpd.apache.org/docs/2.2/mod/mod_proxy_balancer.html, Oct. 21, 2010.

* cited by examiner

PROCESSING DATA AND OPERATING A COMMUNICATIONS DEVICE

CROSS REFERENCE TO RELATED APPLICATION

This application claims priority to U.S. Patent Application Ser. No. 61/529,686, filed on Aug. 31, 2011, the content of which is incorporated herein by reference in its entirety.

TECHNICAL FIELD

The present invention relates to a method of processing data, a method of operating a communications device, an apparatus for processing data, a communications device, and computer program products for performing such methods.

BACKGROUND

In a large-scale distributed system, traffic may be distributed across a cluster of servers by using a hash function to transform an identifier in the traffic (sometimes referred to as a 'hash key') to a hash value. The hash value serves as an index into a hash table and identifies a particular element (sometimes referred to as a 'slot' or a 'bucket') in the hash table, which identifies a given server in the cluster of servers with which the hash value is associated. By processing a traffic identifier in all received traffic in this manner, the traffic can be assigned to a particular server in the cluster that is associated with that hash value. By using an appropriate hash function that has a reasonably uniform output of hash values across the space of all possible outputs, traffic can be distributed more or less evenly across the servers. By providing such a reasonably uniform distribution, the load can be substantially balanced across all of the servers in the cluster.

However, in some situations, the servers in the cluster can change. This may be as a result of servers being removed from the cluster, for example as a result of planned maintenance or unplanned server failure. The change may also be as a result of new servers being added to the cluster to meet increased demand. With cloud computing techniques, such removals and additions may be made many times a day in response to fluctuations in traffic.

Following a change to the servers in the cluster, the set of all possible hash values is reallocated amongst the servers in the cluster so that the load can be shared across any new servers or so that the load can be redistributed from any removed servers. In other words, a hash value that was associated with a particular server may be associated with a different server following the reallocation. Since the traffic is distributed based on the hash values, traffic that was being routed to one server could be directed to a different server in the new cluster as a result of the reallocation. This may be the case even when both servers are neither removed from nor added to the plurality of servers.

In some systems, this is not particularly problematic. However, such reallocation is undesirable in many systems, particularly where a client device establishes a communications session with a server and the server stores information about the session. If the traffic from that client device is directed to another server, the other server may not have access to information relating to the session and the session may be interrupted while the other server retrieves the session data or the session may be dropped altogether. For example, when the traffic from a particular source is reallocated to a new server, any requests that were 'in-flight' to the original server around the time of the reallocation may be lost. Significant additional traffic may be required to re-establish the session on the new server. This additional traffic could significantly affect performance across the entire system when reallocation occurs.

Even for systems which have relatively short-lived sessions, a significant proportion of sessions may experience server reallocation and hence sub-optimal performance or user experience.

One known system provides techniques for load balancing in networks such as networks handling telephony applications. Requests associated with calls are directed to servers in a system comprised of a network routing calls between a plurality of callers and at least one receiver. A load balancer sends requests associated with calls to a plurality of servers. A request associated with a call, a caller, or a receiver is received, depending on the particular load balancing technique. A server is selected to receive the request. A subsequent request is received. A determination is made whether or not the subsequent request is associated with the call, the caller, or the receiver, depending on the particular load balancing technique. The subsequent request is sent to the server based on determining that the subsequent request is associated with the call, the caller, or the receiver, again depending on the particular load balancing technique.

This known system maintains mappings between calls and servers via one or more tables mapping call IDs to server IDs. A load balancer receives a request associated with a call. The table is consulted to determine if there already is a server associated with the call ID. If so, the request is routed to the server corresponding to the call ID. If not, the system determines an appropriate server to handle the request as well as subsequent ones corresponding to the same call.

Although this known system may provide some degree of session 'affinity' or 'persistence' to a particular server, the load balancer has to look into the table every time a request is received. This can create a significant processing overhead.

It would be desirable to provide improved methods and apparatus for processing traffic in a communications system.

SUMMARY

According to a first aspect of the invention, there is provided a method of processing data in a communications system comprising a plurality of servers, the method comprising:
directing first data received from a communications device to a given server in the plurality of servers;
transmitting a server identifier identifying the given server to the communications device;
receiving subsequent data from the communications device, the subsequent data comprising the server identifier and a further parameter;
selecting the given server on the basis of at least the server identifier and directing some of the subsequent data received from the communications device to the given server; and
in the event of a need to redirect subsequent data to a server other than the given server, selecting a different server on the basis of at least the further parameter and directing further of the subsequent data received from the communications device to the selected different server.

According to a second aspect of the invention, there is provided a method of operating a communications device in a communications system comprising a plurality of servers and an intermediate data processing node, the method comprising:
transmitting first data comprising a first parameter to the intermediate data processing node, to allow the intermediate data processing node to direct the first data to a given server in the plurality of servers on the basis of the first parameter;

receiving a server identifier identifying the given server from the intermediate data processing node; and transmitting subsequent data to the intermediate data processing node, the subsequent data comprising the server identifier and a further parameter that is algorithmically related to the first parameter, to allow the intermediate data processing node to select the given server on the basis of at least the server identifier and to direct some of the subsequent data to the given server, and, in the event of a need to redirect subsequent data to a server other than the given server, to select a different server on the basis of at least the further parameter and to direct further of the subsequent data to the selected different server.

According to a third aspect of the invention, there is provided apparatus for processing data in a communications system comprising a plurality of servers, the apparatus comprising:

at least one processor; and at least one memory including computer program code;

the at least one memory and the computer program code being configured to, with the at least one processor, cause the apparatus at least to perform a method of processing data in a communications system comprising a plurality of servers, the method comprising:

directing first data received from a communications device to a given server in the plurality of servers;

transmitting a server identifier identifying the given server to the communications device;

receiving subsequent data from the communications device, the subsequent data comprising the server identifier and a further parameter;

selecting the given server on the basis of at least the server identifier and direct some of the subsequent data received from the communications device to the given server; and in the event of a need to redirect subsequent data to a server other than the given server, selecting a different server on the basis of at least the further parameter and direct further of the subsequent data received from the communications device to the selected different server.

According to a fourth aspect of the invention, there is provided a communications device in a communications system comprising a plurality of servers and an intermediate data processing node, the communications device comprising:

at least one processor; and at least one memory including computer program code;

the least one memory and the computer program code being configured to, with the at least one processor, cause the communication device at least to perform a method comprising:

transmitting first data comprising a first parameter to the intermediate data processing node, to allow the intermediate data processing node to direct the first data to a given server in the plurality of servers on the basis of the first parameter;

receiving a server identifier identifying the given server from the intermediate data processing node; and transmitting subsequent data to the intermediate data processing node, the subsequent data comprising the server identifier and a further parameter that is algorithmically related to the first parameter, to allow the intermediate data processing node is to select the given server on the basis of at least the server identifier and to direct some of the subsequent data to the given server, and, in the event of a need to redirect subsequent data to a server other than the given server, to select a different server on the basis of at least the further parameter and to direct further of the subsequent data to the selected different server.

According to a fifth aspect of the invention, there is provided a computer program product comprising a non-transitory computer-readable storage medium having computer readable instructions stored thereon, the computer readable instructions being executable by a computerized device to cause the computerized device to perform a method for processing data in a communications system comprising a plurality of servers, the method comprising:

directing first data received from a communications device to a given server in the plurality of servers;

transmitting a server identifier identifying the given server to the communications device;

receiving subsequent data from the communications device, the subsequent data comprising the server identifier and a further parameter;

selecting the given server on the basis of at least the server identifier and directing some of the subsequent data received from the communications device to the given server; and in the event of a need to redirect subsequent data to a server other than the given server, selecting a different server on the basis of at least the further parameter and directing further of the subsequent data received from the communications device to the selected different server.

According to a sixth aspect of the invention, there is provided a computer program product comprising a non-transitory computer-readable storage medium having computer readable instructions stored thereon, the computer readable instructions being executable by a computerized device to cause the computerized device to perform a method for operating a communications device in a communications system comprising a plurality of servers and an intermediate data processing node, the method comprising:

transmitting first data comprising a first parameter to the intermediate data processing node, to allow the intermediate data processing node to direct the first data to a given server in the plurality of servers on the basis of the first parameter;

receiving a server identifier identifying the given server from the intermediate data processing node; and transmitting subsequent data to the intermediate data processing node, the subsequent data comprising the server identifier and a further parameter that is algorithmically related to the first parameter, to allow the intermediate data processing node to select the given server on the basis of at least the server identifier and to direct some of the subsequent data to the given server, and, in the event of a need to redirect subsequent data to a server other than the given server, to select a different server on the basis of at least the further parameter and to direct further of the subsequent data to the selected different server.

Further features and advantages of the invention will become apparent from the following description of preferred embodiments of the invention, given by way of example only, which is made with reference to the accompanying drawings.

DETAILED DESCRIPTION

Figure 1:
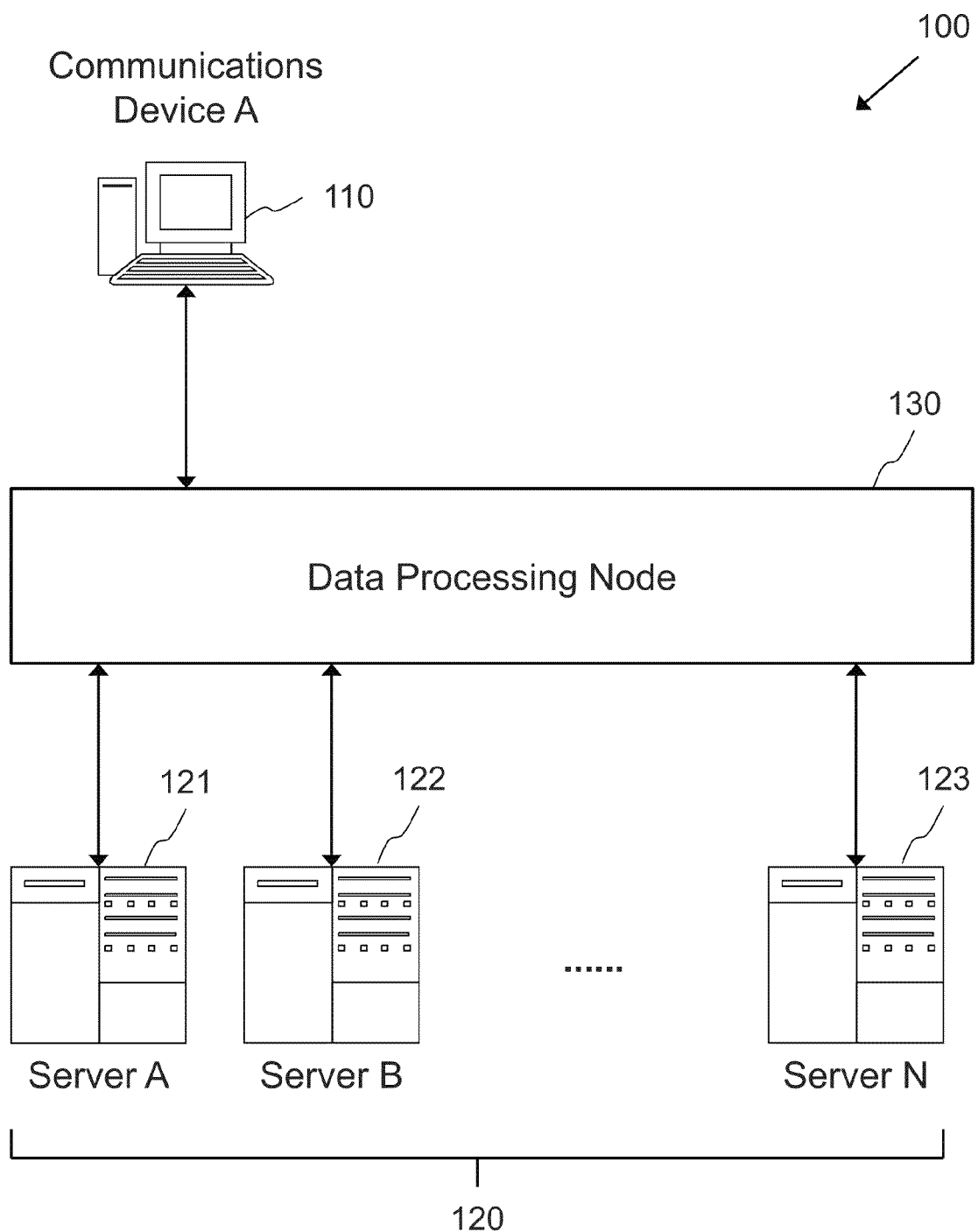
FIG. 1 is a schematic block representation of a communications system according to some embodiments.

In a first embodiment of the invention, there is provided a method of processing data in a communications system comprising a plurality of servers, the method comprising:
directing first data received from a communications device to a given server in the plurality of servers;
transmitting a server identifier identifying the given server to the communications device;
receiving subsequent data from the communications device, the subsequent data comprising the server identifier and a further parameter;
selecting the given server on the basis of at least the server identifier and directing some of the subsequent data received from the communications device to the given server; and
in the event of a need to redirect subsequent data to a server other than the given server, selecting a different server on the basis of at least the further parameter and directing further of the subsequent data received from the communications device to the selected different server.

Since the incoming data can be directed to the given server based on the server identifier, reference need not be made to a table mapping traffic identifiers to servers. Furthermore, because the server identifier identifies the given server, rather than being an input into a mapping table that can readily change, affinity or persistence to the given server is possible even if the cluster of servers or associations between values that are used to distribute traffic and the server with which the values are associated changes. The further parameter may be used to select a different server for the further of the subsequent traffic, in the event of a need to move such subsequent traffic away from the initially selected server. Since this is different to the server identifier, traffic from different devices initially served by the same given server may then be redirected to different servers, for example for load balancing purposes, despite initially being served by the same server and despite including the same identifier in their data traffic.

In some embodiments, the first data received from the communications device may comprise a first parameter and such embodiments may comprise directing the first data received from the communications device to the given server on the basis of the first parameter. Such embodiments provide a mechanism for predictably directing the first data to the given server.

Some embodiments may comprise algorithmically deriving the further parameter from a first parameter in the first data received from the communications device. Such embodiments provide a convenient means by which to obtain the further parameter.

Some embodiments may comprise using a hash function to derive the further parameter. A hash function can be used to increase efficiency in determining a particular server to which data should be directed.

Some embodiments may comprise transmitting the further parameter to the communications device. Such embodiments can reduce the amount of processing required on the communications device, which can be beneficial if the communications device has limited resources.

Some embodiments may comprise determining the occurrence of an event in relation to the plurality of servers, and selecting the different server for the further of the subsequent data based on the occurrence of the event. Such embodiments provide a mechanism for determining when to redirect or switch the subsequent data to the different server.

In some embodiments, the event may be that the given server is unable to receive data. Such embodiments can provide improved user experience and can reduce the likelihood of interruptions to a session by switching the subsequent data to the different server in response to the failure of the given server.

In some embodiments, the event may be that the given server has exceeded a threshold amount of data. Such embodiments can provide improved user experience and can reduce the likelihood of introducing latency into session by switching the subsequent data to the different server in response to the given server being at or near capacity.

Some embodiments may comprise monitoring the status of the given server and the different server. Such embodiments may allow the data processing node to take pre-emptive action, for example before a server reaches capacity so as to relieve the load on the server and to reduce the likelihood of interruptions to a session which might detract from the user experience of using the communications system.

Some embodiments may comprise transmitting a different server identifier identifying the different server to the communications device, receiving additional subsequent data from the communications device, the additional subsequent data comprising the different server identifier, and selecting the different server on the basis of at least the different server identifier and directing the additional subsequent data received from the communications device to the different server. Such embodiments provide a mechanism for scalable persistence to the different server for the additional subsequent data.

In some embodiments, the additional subsequent data may comprise the further parameter. In such embodiments, the further parameter can be used to select yet another different server to which further of the additional subsequent data may be directed, should it be necessary.

In some embodiments, the given server may be in a given pool of servers, the server identifier identifying the given sever may identify the given pool of servers and the given server within the given pool of servers and such embodiments may comprise identifying the given pool of servers based on the server identifier, and selecting the different server on the basis of at least the further parameter and directing further of the subsequent data received from the data source to the different server, the different server being in the given pool of servers. Such embodiments enable the data to be switched from the given server to a selected different server that is 'close' to the given server, whether geographically, logically or in network topology terms by seeking to switch to a different server in the given server pool.

Some embodiments may comprise directing first data received from a second communications device to the given server in the plurality of servers, transmitting the server identifier identifying the given server to the second communications device, receiving subsequent data from the second communications device, the subsequent data comprising the server identifier and a further parameter, the further parameter in the subsequent data received from the second communications device being the same as the further parameter received in the subsequent data from the communications device, selecting the given server on the basis of at least the server identifier and directing some of the subsequent data received from the second communications device to the given server, and, in the event of a need to redirect subsequent data to a server other than the given server, selecting the different server on the basis of at least the further parameter and directing further of the subsequent data received from the second communications device to the different server. Such embodiments provide for data from different devices involved in the same communications session to be switched to the same server on the basis of the further parameter which is common to traffic from both devices. This is a benefit relative to a situation in which the traffic from each device is switched to separate servers because, in such situations, there would be additional traffic and processing associated with the sharing of session state data between the separate servers.

In some embodiments, the communications devices may be involved in a telephone call with each other, the first and subsequent data received from the communications devices may be part of a data communications session separate from the telephone call and the first and subsequent data may comprise a parameter based on which the first data can be directed to the given server. In some embodiments, the parameter may comprise a telephone dialing number. In some embodiments, the parameter may comprise a telephone call identifier. The parameter may thereby serve as a session identifier. Such embodiments provide for the processing of data that is separate from a telephone call, but from a communications device that is involved in a telephone call. Such additional data may relate to additional call-related services, data that can be shared with another party to the telephone call or the like.

In a second embodiment of the invention, there is provided a method of operating a communications device in a communications system comprising a plurality of servers and an intermediate data processing node, the method comprising:

transmitting first data comprising a first parameter to the intermediate data processing node, to allow the intermediate data processing node to direct the first data to a given server in the plurality of servers on the basis of the first parameter;

receiving a server identifier identifying the given server from the intermediate data processing node; and transmitting subsequent data to the intermediate data processing node, the subsequent data comprising the server identifier and a further parameter that is algorithmically related to the first parameter, to allow the intermediate data processing node to select the given server on the basis of at least the server identifier and to direct some of the subsequent data to the given server, and, in the event of a need to redirect subsequent data to a server other than the given server, to select a different server on the basis of at least the further parameter and to direct further of the subsequent data to the selected different server.

Since the incoming data can be directed to the given server based on the server identifier, reference need not be made to a table mapping traffic identifiers to servers. Furthermore, because the server identifier identifies the given server, rather than being an input into a mapping table that can readily change, affinity or persistence to the given server is possible even if the cluster of servers or associations between values that are used to distribute traffic and the server with which the values are associated changes. The further parameter may be used to select a different server for the further of the subsequent traffic, in the event of a need to move such subsequent traffic away from the initially selected server. Since this is different to the server identifier, traffic from different devices initially served by the same given server may then be redirected to different servers, for example for load balancing purposes, despite initially being served by the same server and despite including the same identifier in their data traffic.

Some embodiments may comprise receiving the further parameter from the intermediate data processing node. In such embodiments, the communications device need not derive the further parameter, which can be beneficial where the communications device has limited resources.

Some embodiments may comprise deriving the further parameter from the first parameter. In such embodiments, the communications device need not rely on the data processing device to derive the further identifier.

In a third embodiment of the invention, there is provided apparatus for processing data in a communications system comprising a plurality of servers, the apparatus being arranged to:

direct first data received from a communications device to a given server in the plurality of servers;

transmit a server identifier identifying the given server to the communications device;

receive subsequent data from the communications device, the subsequent data comprising the server identifier and a further parameter;

select the given server on the basis of at least the server identifier and direct some of the subsequent data received from the communications device to the given server; and in the event of a need to redirect subsequent data to a server other than the given server, select a different server on the basis of at least the further parameter and direct further of the subsequent data received from the communications device to the selected different server.

In a fourth embodiment of the invention, there is provided a communications device in a communications system comprising a plurality of servers and an intermediate data processing node, the communications device being arranged to:

transmit first data comprising a first parameter to the intermediate data processing node, to allow the intermediate data processing node to direct the first data to a given server in the plurality of servers on the basis of the first parameter;

receive a server identifier identifying the given server from the intermediate data processing node; and transmit subsequent data to the intermediate data processing node, the subsequent data comprising the server identifier and a further parameter that is algorithmically related to the first parameter, to allow the intermediate data processing node to select the given server on the basis of at least the server identifier and to direct some of the subsequent data to the given server, and, in the event of a need to redirect subsequent data to a server other than the given server, to select a different server on the basis of at least the further parameter and to direct further of the subsequent data to the selected different server.

In a fifth embodiment of the invention, there is provided a computer program product comprising a non-transitory computer-readable storage medium having computer readable instructions stored thereon, the computer readable instructions being executable by a computerized device to cause the computerized device to perform a method for processing data in a communications system comprising a plurality of servers, the method comprising:

directing first data received from a communications device to a given server in the plurality of servers;

transmitting a server identifier identifying the given server to the communications device;

receiving subsequent data from the communications device, the subsequent data comprising the server identifier and a further parameter;

selecting the given server on the basis of at least the server identifier and directing some of the subsequent data received from the communications device to the given server; and in the event of a need to redirect subsequent data to a server other than the given server, selecting a different server on the basis of at least the further parameter and directing further of the subsequent data received from the communications device to the selected different server.

In a sixth embodiment of the invention, there is provided a computer program product comprising a non-transitory computer-readable storage medium having computer readable instructions stored thereon, the computer readable instructions being executable by a computerized device to cause the computerized device to perform a method for operating a communications device in a communications system comprising a plurality of servers and an intermediate data processing node, the method comprising:

transmitting first data comprising a first parameter to the intermediate data processing node, to allow the intermediate data processing node to direct the first data to a given server in the plurality of servers on the basis of the first parameter;

receiving a server identifier identifying the given server from the intermediate data processing node; and transmitting subsequent data to the intermediate data processing node, the subsequent data comprising the server identifier and a further parameter that is algorithmically related to the first parameter, to allow the intermediate data processing node to select the given server on the basis of at least the server identifier and to direct some of the subsequent data to the given server, and, in the event of a need to redirect subsequent data to a server other than the given server, to select a different server on the basis of at least the further parameter and to direct further of the subsequent data to the selected different server.

FIG. 1 shows a communications system 100 according to some embodiments. The communications system 100 includes a communications device 110 which is a source of traffic data in the communications system 100, a plurality of servers 120 that serve requests from the communications device 110, and a data processing node 130 which is intermediate the communications device 110 and the servers 120 and which processes data in the communications system 100.

The communications device 110 is referred to herein, and is shown in FIG. 1, as 'communications device A'. In these embodiments, communications device A is a computing device, such as a personal computer, that has data processing and data transfer capabilities. The communications device 110 comprises at least one processor and at least one memory including computer program code. The at least one memory and the computer program code are configured to, with the at least one processor, cause the communications device 110 to be controlled.

Communications device A may transmit and receive various types of data within the communications system 100.

In some embodiments, the data may be in the form of request and response messages. For example, communications device A may request a web page from a web server using a web browser application and may receive a response from the web server that enables the web page to be displayed in the web browser. In such cases, a user of communications device A may interact with the web page, for example by clicking on a hyperlink on the retrieved web page, which causes communications device A to transmit another request message to the web server obtain the content associated with the hyperlink. The web server can then respond with the requested content. As explained above, the exchange of data in such a manner is typically referred to as a session. It is generally desirable that the session be maintained with a given server where possible.

In some embodiments, the data transfer between communications device A and a server may form one leg or part of a communication session between communications device A and another communications device in the communications system 100. For example, the server may be a media server and the traffic may be a stream of Real-time Transport Protocol (RTP) data that is processed, for example by way of transcoding, by the media server. In such cases, it is desirable that both communications devices establish and maintain connections with the same server as each other so that the RTP data can be processed on a single server rather than being processed separately on several servers and the processed data being shared between the servers.

Other types of data may be shared between the computing devices via the server. For example, the data may comprise media data, such as music, video or image media data, data files, address book contact information, location data, video game data and the like.

The plurality of servers 120 is a cluster of servers that is sometimes referred to as a 'server farm'. The plurality of servers includes a total of 'N' servers, referred to herein and shown in FIG. 1 as server 'A' through server 'N'. Servers A, B and N are represented by reference signs 121, 122 and 123 in FIG. 1.

The plurality of servers 120 sits behind the data processing node 130, which is intermediate communications device A and the plurality of servers 120. The data processing node 130 processes traffic received from communications device A and the plurality of servers 120 and may have other capabilities such as load-balancing, firewall and Network Address Translation (NAT) capabilities.

The data processing node 130 comprises at least one processor and at least one memory including computer program code. The at least one memory and the computer program code are configured to, with the at least one processor, cause the data processing node 130 to process data.

In use, the data processing node 130 receives first data from communications device A. The first data may be in the form of an initial request message or another form of data.

In some embodiments, the first data comprises a first parameter, which the data processing node 130 uses to determine how to process the first data. In some embodiments, the data processing node 130 may use the first parameter to select a given server in the plurality of servers 120 for the first data and may then direct the first data to the given server on the basis of the first parameter. In some embodiments, the first parameter may be, but is not limited to being, a source Internet Protocol (IP) address of communications device A, a session identifier or token that identifies a particular session as part of which the first data was sent, a Uniform Resource Locator (URL) identifying a requested resource or the like. The first parameter may be associated with a given server in the plurality of servers 120, and the selection of the given server for the first traffic may be on the basis of that association.

In some embodiments, the data processing node 130 may algorithmically derive a further parameter from the first parameter. The data processing node 130 may use the further parameter derived from the first parameter to select the given server in the plurality of servers 120 for the first data and may then direct the first data to the selected server on the basis of the further parameter. For example, the further parameter may be associated with the given server, and the selection of the given server for the first traffic may be on the basis of that association.

In some embodiments, the algorithmic derivation may be by means of using the first parameter as an input to a hash function, the output of the hash function being the further parameter. In such cases, the further parameter may be in the form of a 'hash key' or 'hash value'. Different servers in the plurality of servers 120 are each allocated a subset of hash values in the set of all possible hash values that could be output values of the hash function. The data processing node 130 determines the given server to be the server in the plurality of servers 120 that is associated with the particular hash value derived from the first parameter in the first data and directs the first data to the given server on that basis.

In some embodiments, communications device A may derive the further parameter itself from the first identifier. In such embodiments, communications device A may transmit the derived further parameter to the data processing node 130.

In some embodiments, for example where the data processing node 130 derives the further parameter, the data processing node 130 transmits the further parameter to communications device A. The data processing node 130, having directed the first data to the given server, also transmits a server identifier identifying the given server to communications device A. The server identifier may be any suitable identifier from which the data processing node 130 can identify the given server. The further parameter and the server identifier identifying the given server may be combined to form a single, new identifier for the data.

The data processing node 130 receives subsequent data from communications device A which includes the server identifier and the further parameter. As explained above, the further parameter may be derived from the first parameter in the first data. For example, in some embodiments, the further parameter may be the hash value used to select the given server in the plurality of servers to which the first data was directed.

The data processing node 130 selects the given server on the basis of at least the server identifier identifying the given server which it previously sent to communications device A. It then directs some of the subsequent data received from communications device A to the given server. In addition to using the server identifier identifying the given server, the selection may be based on other information received from communications device A, such as a priority associated with the data, the status of one or more entities in the communications system 100, for example whether the given server can receive data, or the like.

In the event of a need to redirect subsequent data to a server other than the given sever, the data processing node 130 selects a different server to the given server on the basis of at least the further parameter. The data processing node 130 directs further of the subsequent data received from communications device A to the different server. In addition to using the further parameter, the selection may be based on other information received from communications device A, such as a priority associated with the data, the status of one or more entities in the communications system 100, for example whether the given server or the different server can receive data, or the like.

The switching, from directing some of the subsequent data to the given server on the basis of at least the server identifier to directing further of the subsequent data to the different server on the basis of at least the further parameter, may be in response to the data processing node 130 determining the occurrence of an event in relation to the plurality of servers 120. In response to the occurrence of the event, the data processing node 130 directs the further of the subsequent data to the different server.

In some embodiments, the event, in response to which the switching occurs, may be that the given server is unable to receive data, for example if it has failed. In some embodiments, the event may be that the given server has received a threshold amount of data and so further data should not be directed to the given server.

In some embodiments, the data processing node 130 selects the different server on the basis of the further parameter, which is the output value of a hash function to which the first parameter is the input. In such embodiments, the given server may be associated with a subset of all possible output values of the hash function, the subset including the further parameter. If the data processing node 130 decides to direct the further of the subsequent traffic to the different server on the basis of the further parameter, then it is possible that other sessions that have been established with the given server were established by virtue of the association of the given server with a different value in the subset with which it is associated. Since there may be several such values in the subset, the different value—including the further parameter—can be used as inputs into a hash function, which provides a range of output values, which range of output values can be used to select a range of different servers with which the various sessions can be re-established. This is generally a benefit compared to all of the sessions that have been established with the given server being switched to a single other server.

In some embodiments, the data processing node 130 transmits a different server identifier identifying the different server to communications device A. Communications device A can then include the different server identifier identifying the different server in additional subsequent data. The data processing node 130 can select the different server on the basis of at least the different server identifier identifying the different server and direct the additional subsequent data to the different server.

Figure 2:
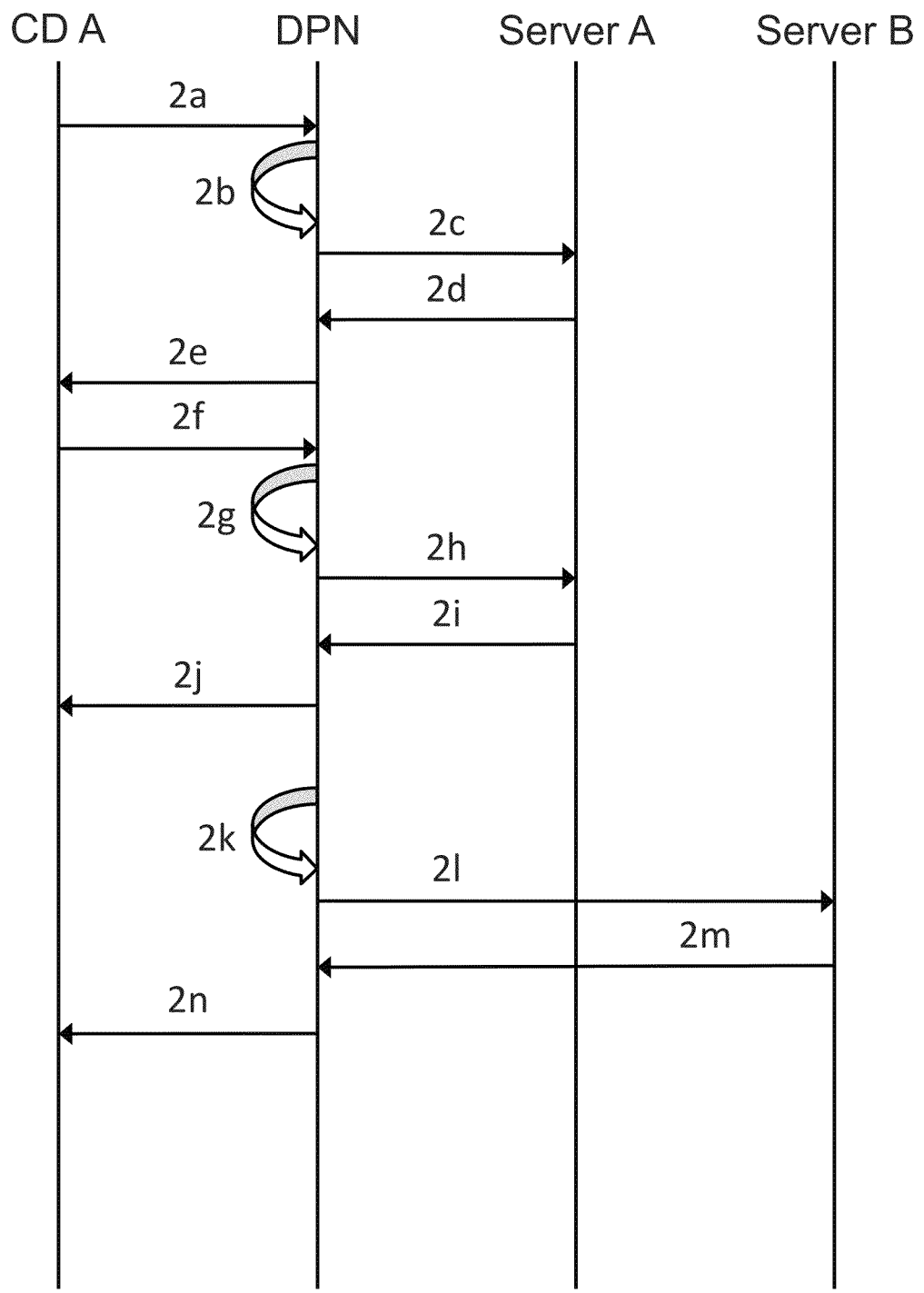
FIG. 2 is a sequence diagram showing a method of processing data according to some embodiments.

FIG. 2 is a sequence diagram showing a method of processing data according to some embodiments.

At step 2a, communications device A transmits first data to the data processing node 130. The first data includes the first parameter.

At step 2b, the data processing node 130 receives the first data from communications device A. The data processing node 130 uses the first parameter to select the given server in the plurality of servers 120 to which the first data should be directed and directs the first data to the given server on the basis that the given server is associated with the first parameter. In some embodiments, the data processing node 130 uses the first parameter as an input into hash algorithm. The output of the hash algorithm is a hash value which can be used to assign the first data to the given server in the plurality of servers 120 on the basis that the given server is associated with that hash value.

At step 2c, the data processing node 130 directs the first data to the given server.

At step 2d, the given server responds to the data processing node 130 with response data. The response data may be an acknowledgement message, confirming receipt of the first data. The response data may comprise additional data, such as media data, data files and the like, for example if the first data comprises a request for such data.

At step 2e, the data processing node 130 transmits response data to communications device A based on the response data it received from the given server at step 2d. The response data may be an acknowledgement message, confirming receipt of the first data by the given server. The response data may comprise additional data, such as any additional data the data processing node 130 received from the given server at step 2d.

The data processing node 130 also transmits a server identifier, identifying the given server to which it directed the first data, and the further parameter, to communications device A at step 2e. In some embodiments, the further parameter is the hash value derived from the first parameter by the data processing node 130 at step 2b.

At step 2f, communications device A sends subsequent data to the data processing node 130. The subsequent data may relate to the same session to which the first data relates. As such, it is generally desirable that the subsequent data be directed to the given server to which the first data was directed. The subsequent data includes both the server identifier and the further parameter.

At step 2g, the data processing node 130 receives the subsequent data sent to it by communications device A at step 2f. The data processing node 130 uses the server identifier to identify the given server to which the data processing node 130 previously directed the first data, so that the subsequent data can be directed to the same, given server. The data processing node 130 can thereby determine the server in the plurality of servers 120 to which the data from communications device A should be directed to maintain session affinity, where possible.

In some embodiments, the data processing node 130 may attempt to direct the subsequent data to the given server and then take an appropriate action based on whether or not it receives a response from the given server. If the data processing node 130 does not receive a response or acknowledgement from the given server, it may infer that the given server is currently unable to receive data and can then direct the subsequent data to the different server.

In some embodiments, the data processing node 130 periodically determines the status of the servers in the plurality of servers 120. This may include determining whether or not a particular server has developed a serious fault that means that it is unable to receive any data, that it is currently experiencing a high volume of data so that any new sessions should not be established with that server or such like. In such embodiments, the data processing node 130 may then determine that the subsequent data should not be directed to the given server and can select another server in the plurality of servers to which the subsequent data should be directed.

At step 2h, the data processing node 130 transmits some of the subsequent data to the given server on the basis that it is able to receive the data. At step 2i, the given server transmits response data to the data processing node 130. The data processing node 130 then transmits response data to communications device A at step 2j. Communications device A can continue to send subsequent data to the data processing node 130, including at least the server identifier identifying the given server, which the data processing node 130 continues to direct to the given server on the basis of the server identifier.

At step 2k, the data processing node 130 determines that the given server is unable to continue receiving the subsequent data or otherwise determines that further of the subsequent traffic should be directed to a server that is different from the given server. The data processing node 130 uses the further parameter in the subsequent data to select the different server on the basis of at least the further parameter and directs further of the subsequent data to the different server.

As explained above, in some embodiments, the further parameter comprises a hash value which is a hash of the first parameter included in the first data. In some embodiments, the hash value was used by the data processing node 130 at step 2b to determine the given server to which the first data from communications device A should be directed.

The hash value that was previously associated with the given server may now be associated with a different server as a result of assigning different hash values to different servers. In some embodiments, the different server may be in the same plurality of servers 120 that were available when the data processing node 130 made the determination at step 2b. In other embodiments, the different server may be a new server that was not included in the original plurality of servers 120, for example if the different server was added to cope with increased demand or in view of failure of the given server or another server.

At step 2l, the data processing node 130 sends the further of the subsequent data to the different server. At step 2m, the data processing node 130 receives response data from the different server.

At step 2n, the data processing node 130 transmits response data to communications device A. The data processing node 130 also transmits a different server identifier identifying the different server to communications device A. As such, further of the subsequent data can be directed to the different server, even if the given server subsequently becomes able to receive data, so that session affinity is provided between communications device A and the different server.

Figure 3:
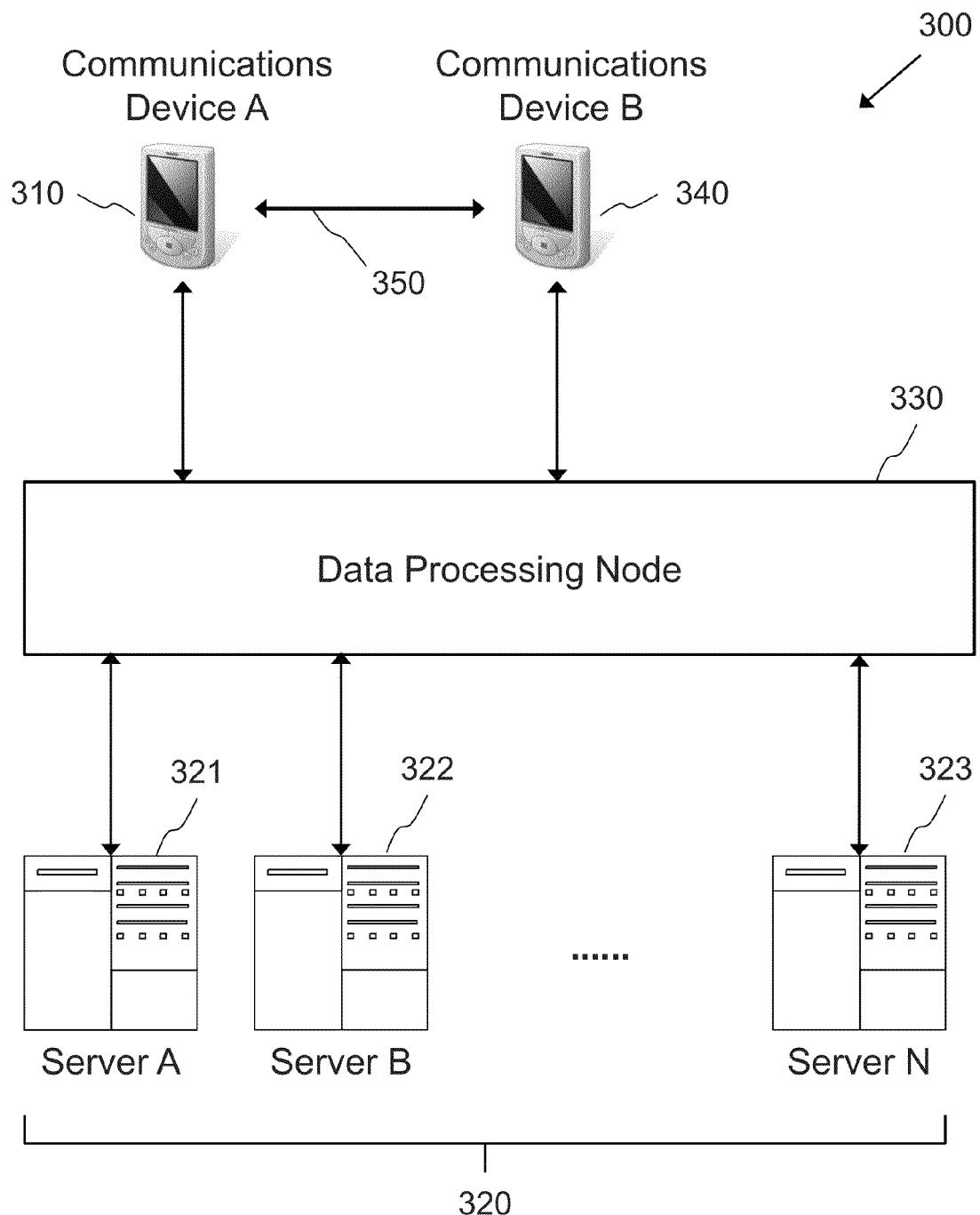
FIG. 3 is a schematic block representation of a communications system according to some embodiments.
Figure 4A:
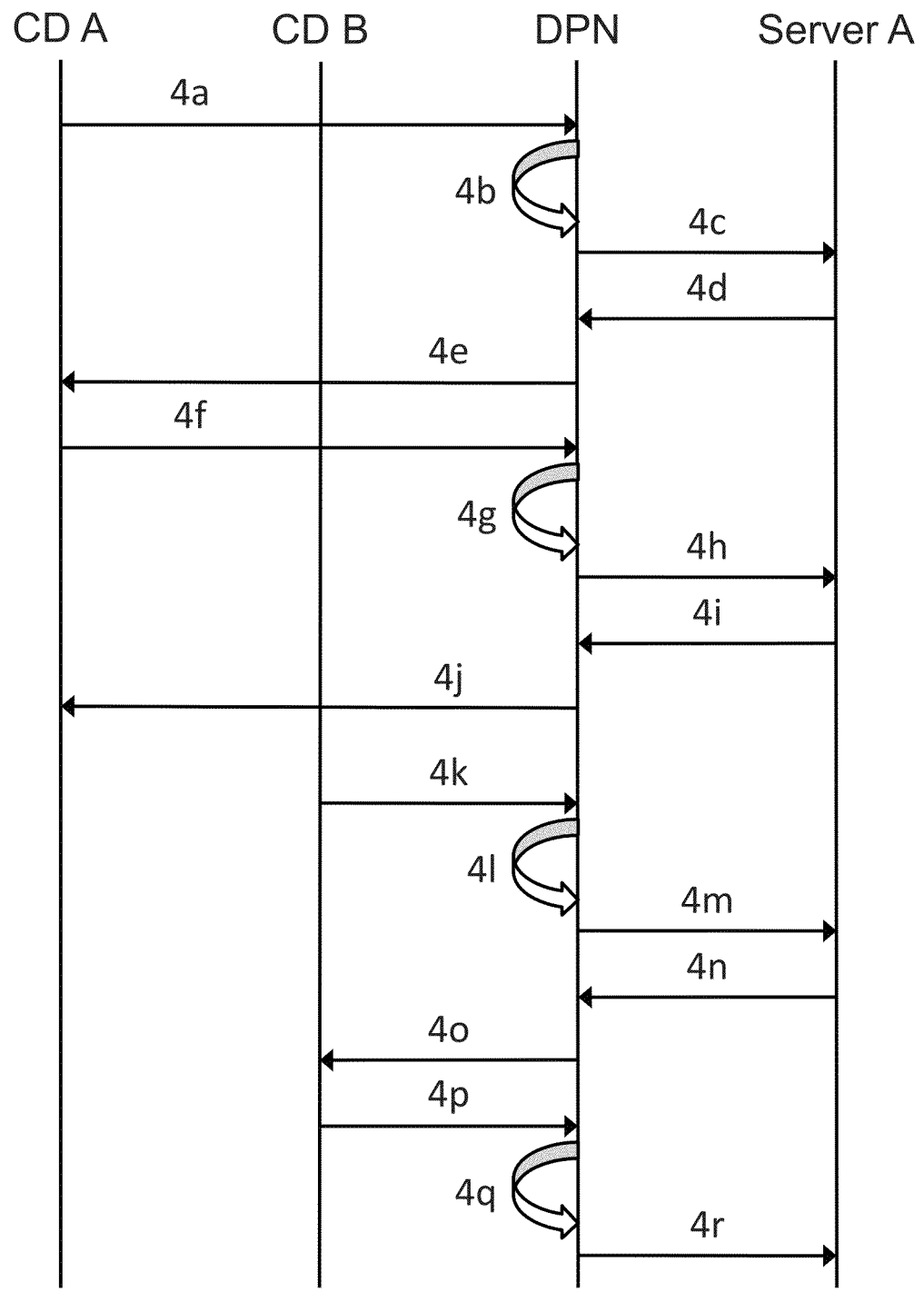
FIGS. 4A and 4B are a sequence diagram showing a method of processing data according to some embodiments.
Figure 4B:
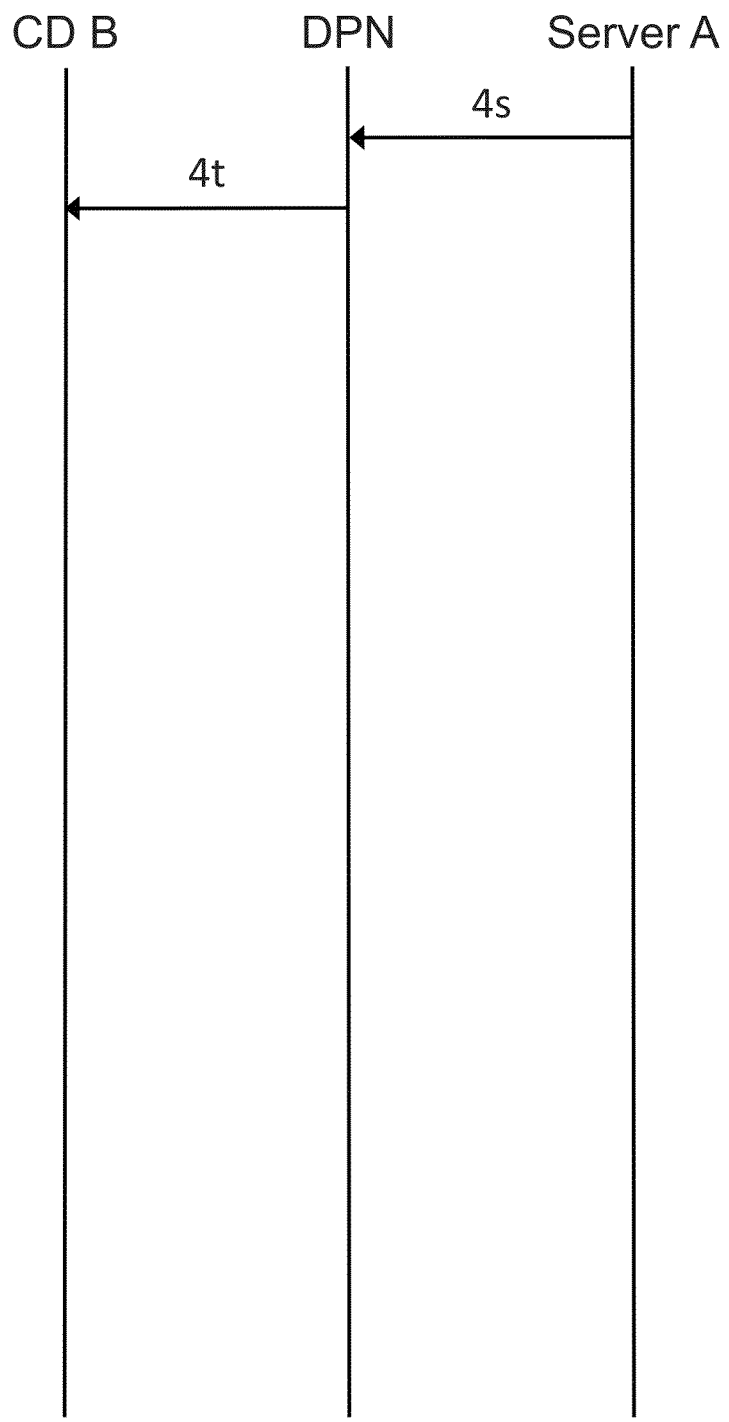

FIG. 3 shows a communications system 300 according to some embodiments. FIG. 3 shows various elements that are substantially the same as those shown in FIG. 1 and described in detail above. Like elements will be shown and described in relation to FIG. 3 using the same reference numerals as those used in relation to FIG. 1, but incremented by 200.

In particular, the communications system 300 includes a data processing node 330 and a plurality of servers 320. The communications system 300 also includes first and second communications devices 310, 340, referred to herein and denoted in FIG. 3 as communications devices A and B.

In the embodiments described with reference to FIG. 3, the communications devices A and B are mobile telephones that have data processing and data transfer capabilities and include operating systems that, amongst other things, support the running of software applications or 'apps'. However, these embodiments may be equally applicable to other types of communications device.

Mobile telephones A and B are also capable of conducting telephone calls with other mobile telephones via a mobile network such as a Global System for Mobile Communications (GSM) network.

As indicated by reference 350 on FIG. 3, mobile telephones A and B are currently involved in a telephone call with each other.

Steps 4a to 4j correspond to steps 2a to 2j respectively for establishing a leg of a data communication session between mobile telephone A and the given server. Steps 4k to 4t correspond to steps 2a to 2j respectively but for establishing another leg of a data communications session between mobile telephone B and the given server. As such, a multiparty data communications session can be established between mobile telephone A and mobile telephone B via the given server.

In these embodiments, the data processing node 330 directs first data from mobile telephones A and B to the same given server on the basis of a first parameter in the first data received from each of mobile telephones A and B.

In some embodiments, the first parameter is associated with a telephone call in which communications device A or a telephony device associated with communications device A is involved. The first parameter may be or may include a calling party identifier, such as a telephone dialing number or Session Initiation Protocol (SIP) Uniform Resource Identifier (URI), associated with the telephony party that initiated the telephone call. The first parameter may be or may include a called party identifier, such as a telephone dialing number or SIP URI, associated with the telephony party that answered the telephone call. The first parameter may be or may include a call identifier, such as a SIP CallID, associated with the telephone call in which communications device A is involved. In such embodiments, the first parameter is common to both parties involved in the telephone call.

In some embodiments, mobile telephones A and B both run communications session application software that detects that the telephone call is in progress. The communications session application software can notify the data processing node 330 of call party details for the call. In such cases, since the first parameter is common to both the first data from mobile telephone A and mobile telephone B, and since the given server is selected based on the common first parameter, the first data from both mobile telephone A and mobile telephone B is directed to the same, given server on the basis of the common first parameter.

By transmitting the server identifier identifying the given server to both mobile telephone A and mobile telephone B, and receiving the server identifier identifying the given server in subsequent data from both mobile telephone A and mobile telephone B, the data processing node 330 can direct some of the subsequent data from both mobile telephone A and mobile telephone B to the same, given server in the plurality of servers 320.

By transmitting the further parameter to both mobile telephone A and mobile telephone B, and receiving the further parameter in subsequent data from both mobile telephone A and mobile telephone B, the data processing node can direct further of the subsequent data from both mobile telephone A and mobile telephone B to a common different server in the plurality of servers.

Similarly to steps 2$k$ to 2$n$ described above with reference to FIG. 2, in the event of a need to redirect subsequent data to a server other than the given server, the data processing node 330 determines that further of the subsequent data from mobile telephone A and mobile telephone B should be directed to a different server in the plurality of servers 320, and selects the different server on the basis of the further parameter. A new leg of a session can then be established between mobile telephone A and the different server and another new leg of the session can be established between mobile telephone B and the different server.

Since the further parameter is common to the subsequent data from both mobile telephone A and mobile telephone B, and the further of the subsequent data from both mobile telephone A and mobile telephone B is directed to the different server in the plurality of servers 320 based on the further parameter, the data from both mobile telephone A and mobile telephone B is directed to the same server. As such, the two legs are switched to the same server.

Figure 5:
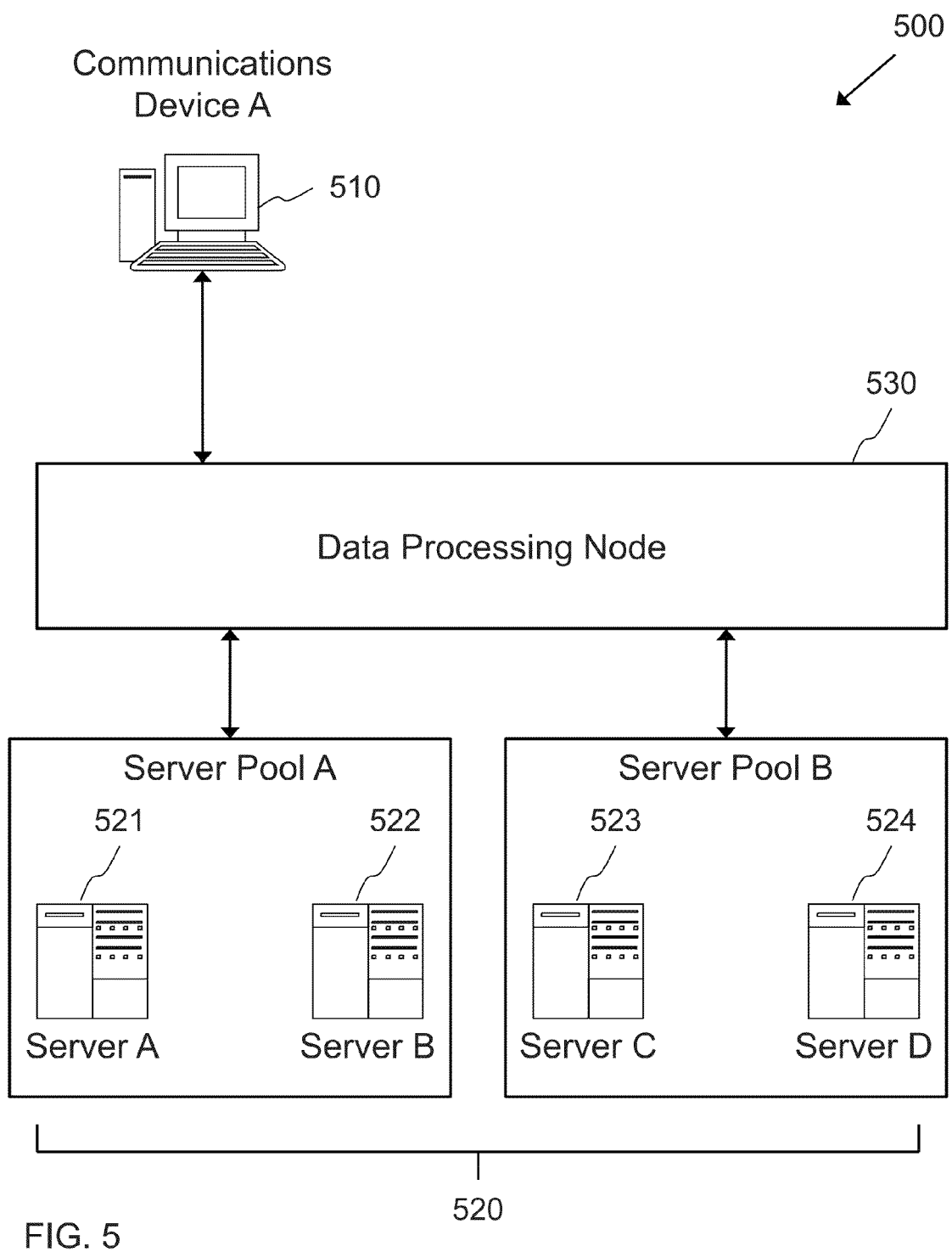
FIG. 5 is a schematic block representation of a communications system according to some embodiments.

FIG. 5 shows a communications system 500 according to some embodiments.

FIG. 5 shows various elements that are substantially the same as those shown in FIG. 1 and that have been described in detail above. Like elements will be shown and described in relation to FIG. 5 using the same reference numerals as those used in relation to FIG. 1, but incremented by 400.

In particular, the communications system 500 includes a communications device 510, data processing node 530 and a plurality of servers 520.

The plurality of servers, in this case servers 521 to 524 which are shown in FIG. 5 as servers A through D, are logically grouped into different server pools; server pool A and B. In these embodiments, two servers—server A and server B—are grouped in a server pool A and two other servers—server C and server D—are grouped in a different server pool B.

As explained above, the data processing node 530 directs first data received from communications device A to a given server in the plurality of servers 520. The data processing node 530 also transmits a server identifier identifying the given server to communications device A.

In some embodiments, the server identifier may comprises a server pool identifier component, which identifies a server pool in which the given server is located, and another component, which identifies the given server within the server pool. In such embodiments, if the data processing node 530 determines that the further of the subsequent traffic should be directed to a different server, it can determine whether there are any other servers in the same server pool as the given server on the basis of the server pool identifier component and can select another server within that server pool, if so, using the further parameter.

In such embodiments, particularly in the case of a communications system 500 with a large number of servers, some session state may be maintained in a database local to a particular pool of servers rather than share the database between all servers. This may be used to address difficulties in database scaling associated with large pools of servers that use a shared database for session state. By persisting a session to a given server, state related to the session may be cached locally on the given server, rather than having to be stored centrally.

In such embodiments, the server identifier may comprise a component that identifies a subset of servers, for example a server pool identifier that identifies a pool of servers, and a component that identifies an element of that subset, for example an identifier that identifies a particular one of the servers in the subset of servers. This may be extended to an arbitrary number of layers of server pool groups and subgroups, depending on the requirements of the communications system 500, where data is directed to a server that is as 'close' to the given server as possible in order to minimise disruption in the communications system. Such 'closeness' may be based on geographical proximity, logical proximity, network topology or other factors.

The above embodiments are to be understood as illustrative examples of the invention. Further embodiments of the invention are envisaged.

In some of the embodiments described above, the first data comprises a first parameter and is directed to the given server on the basis of the first parameter, for example by using the first parameter as an input into a hash algorithm and directing the first data to a server that is associated with the hash value which is the output of the hash algorithm.

In some embodiments, the first data received from the data source may be assigned to the given server in another manner. In some embodiments, the first data may be assigned randomly to the given server from the available servers in the cluster of servers. In some embodiments, the data processing node 130, 330, 530 may assess the load on each of the servers in the plurality of servers 120, 320, 520 and may direct the first data to the server that has the lowest load. In some embodiments, the data processing node 130, 330, 530 may direct the first data in a round-robin manner, where data is directed to successive available servers in the plurality of servers 120, 320, 520.

In some embodiments described above, the communications devices 110, 310, 340, 510 comprise computing devices or mobile telephones. However, other types of communication device are contemplated, such as, but not being limited to, a television, a smart television, a general purpose desktop computer terminal, a general purpose laptop computer terminal, a general purpose tablet computer terminal, an in-car computing and communications system a satellite navigation system, games console, or any combination thereof.

In some of the embodiments described above, the term 'session' is used to refer to an exchange of data between one or more client devices and a server. In some cases, the session may comprise the entirety of data exchange between the client and the server, from initial connection to disconnect. In other cases, the session may comprise only a subset of the total exchange between the client and the server within the communications system. For example, in the case of a communications system that provides for editing of electronic documents, a session may be initiated when a user opens a document for editing and may end when the user closes the document. There may be multiple such sessions within a single continuous use of the communications system 100, 300, 500.

In some of the embodiments described above, the term 'server' is used to refer to a single hardware or software node that serves requests from communications devices 110, 310, 340, 510. However, this term is also intended to refer to a set of such nodes that are considered by the communications system 100, 300, 500 to be capable of maintaining session integrity for the user.

It has been explained above that the mapping between possible hash values and servers in the plurality of servers 120, 320, 520 may change if the makeup of the plurality of servers changes. However, the mapping may change more frequently, for example to reduce the amount of traffic sent to a server that is nearing capacity.

In some of the embodiments described above, the data processing node 130, 330, 530 directs some of the further traffic to the given server on the basis of the server identifier until the given server develops a fault which makes it unable to receive data. However, in some cases, the data processing node 130, 330, 530 may determine that the given server is already at or over its capacity to handle further data, and may then direct the further of the subsequent data to a different server. This may be desirable so as not to introduce latency into data processing within the communications system 100, 300, 530 which may detract from the user experience. In such cases, the data processing node 130, 330, 530 may direct the traffic to the different server and transmit a different server identifier identifying the different server to the communications device 110, 310, 340, 510 so that additional subsequent data can be directed to the different server. In such cases, the session may not need to be interrupted.

In some of the embodiments described above, the data processing node 130, 330, 530 is a single computing device or server. However, in other embodiments, the data processing node 130, 330, 530 may comprise multiple computing devices or servers that need not communicate with each other to be able to direct the subsequent data to a particular server. In particular, since the given server is selected on the basis of at least the server identifier and the different server is selected on the basis of at least the further parameter, and the subsequent traffic comprises the server identifier and the further parameter, it is not necessary to maintain a table that maps, for example, call IDs to server IDs, to be able to direct to traffic in this way.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing data in a communications system with a plurality of servers, the method comprising:
   directing first data received from a communications device to a given server in the plurality of servers;
   transmitting a server identifier identifying the given server to the communications device;
   receiving subsequent data from the communications device, the subsequent data comprising the server identifier and a further parameter;
   selecting the given server on the basis of at least the server identifier and directing some of the subsequent data received from the communications device to the given server; and
   in the event of a need to redirect subsequent data to a server other than the given server, selecting a different server on the basis of at least the further parameter and directing further of the subsequent data received from the communications device to the selected different server.

2. The method according to claim 1, wherein the first data received from the communications device comprises a first parameter and wherein the method further comprises directing the first data received from the communications device to the given server on the basis of the first parameter.

3. The method according to claim 1, further comprising algorithmically deriving the further parameter from a first parameter in the first data received from the communications device.

4. The method according to claim 1, further comprising using a hash function to derive the further parameter.

5. The method according to claim 1, further comprising transmitting the further parameter to the communications device.

6. The method according to claim 1, further comprising:
   determining the occurrence of an event in relation to the plurality of servers; and
   selecting the different server for the further of the subsequent data based on the occurrence of the event.

7. The method according to claim 6, wherein the event is that the given server is unable to receive data.

8. The method according to claim 6, wherein the event is that the given server has exceeded a threshold amount of data.

9. The method according to claim 1, further comprising monitoring the status of the given server and the different server.

10. The method according to claim 1, further comprising:
    transmitting a different server identifier identifying the different server to the communications device;
    receiving additional subsequent data from the communications device, the additional subsequent data comprising the different server identifier; and selecting the different server and directing the additional subsequent data received from the communications device to the different server on the basis of at least the different server identifier.

11. The method according to claim 10, wherein the additional subsequent data comprises the further parameter.

12. The method according to claim 1, wherein the given server is in a given pool of servers, wherein the server identifier identifying the given sever identifies the given pool of servers and the given server within the given pool of servers and wherein the method further comprises:
identifying the given pool of servers based on the server identifier; and
selecting the different server and directing further of the subsequent data received from the data source to the different server in the subset on the basis of at least the further parameter, the different server being in the given pool of servers.

13. The method according to claim 1, further comprising:
directing first data received from a second communications device to the given server in the plurality of servers;
transmitting the server identifier identifying the given server to the second communications device;
receiving subsequent data from the second communications device, the subsequent data comprising the server identifier and a further parameter, the further parameter in the subsequent data received from the second communications device being the same as the further parameter received in the subsequent data from the communications device;
selecting the given server on the basis of at least the server identifier and directing some of the subsequent data received from the second communications device to the given server; and
in the event of a need to redirect subsequent data to a server other than the given server, selecting the different server on the basis of at least the further parameter and directing further of the subsequent data received from the second communications device to the different server.

14. The method according to claim 13, wherein the communications devices are involved in a telephone call with each other, wherein the first and subsequent data received from the communications devices is part of a data communications session separate from the telephone call and wherein the first and subsequent data comprises a parameter based on which the first data can be directed to the given server.

15. The method according to claim 14, wherein the parameter comprises a telephone dialing number.

16. The method according to claim 14, wherein the parameter comprises a telephone call identifier.

17. An apparatus for processing data in a communications system with a plurality of servers, the apparatus comprising:
at least one processor; and
at least one memory including computer program code,
wherein the memory and the computer program code are configured to cause the processor to perform a method of processing data in a communications system comprising a plurality of servers, the method comprising:
directing first data received from a communications device to a given server in the plurality of servers,
transmitting a server identifier identifying the given server to the communications device,
receiving subsequent data from the communications device, the subsequent data comprising the server identifier and a further parameter,
selecting the given server on the basis of at least the server identifier and direct some of the subsequent data received from the communications device to the given server, and
in the event of a need to redirect subsequent data to a server other than the given server, selecting a different server on the basis of at least the further parameter and direct further of the subsequent data received from the communications device to the selected different server.

18. A computer program product including a non-transitory computer-readable storage medium having computer readable instructions stored thereon, the computer readable instructions being executable by a computerized device to cause the computerized device to perform a method for processing data in a communications system with a plurality of servers, the method comprising:
directing first data received from a communications device to a given server in the plurality of servers;
transmitting a server identifier identifying the given server to the communications device;
receiving subsequent data from the communications device, the subsequent data comprising the server identifier and a further parameter;
selecting the given server on the basis of at least the server identifier and directing some of the subsequent data received from the communications device to the given server; and
in the event of a need to redirect subsequent data to a server other than the given server, selecting a different server on the basis of at least the further parameter and directing further of the subsequent data received from the communications device to the selected different server.

* * * * *